United States Patent [19]
Koide et al.

[11] Patent Number: 5,405,165
[45] Date of Patent: Apr. 11, 1995

[54] INSERT MATERIAL OF AIR BAG COVER

[75] Inventors: Teruhiko Koide; Hiroaki Shinto, both of Aichi, Japan

[73] Assignee: Kabushiki Kaisha Tokai-Rika-Denki-Seisakusho, Aichen, Japan

[21] Appl. No.: 141,696

[22] Filed: Oct. 26, 1993

Related U.S. Application Data

[63] Continuation of Ser. No. 945,150, Sep. 15, 1992, abandoned.

[30] Foreign Application Priority Data

Sep. 20, 1991 [JP] Japan .................. 3-075956 U

[51] Int. Cl.⁶ .............................................. B60R 21/16
[52] U.S. Cl. ...................................... 280/731; 280/727
[58] Field of Search .................... 280/731, 732, 727; 428/43

[56] References Cited

U.S. PATENT DOCUMENTS 5,069,477  12/1991  Shiraki ........................... 280/732

FOREIGN PATENT DOCUMENTS 63-251352  10/1988  Japan .
3186451  3/1991  Japan .

Primary Examiner—James J. Bell
Attorney, Agent, or Firm—Sixbey, Friedman Leedom & Ferguson

[57] ABSTRACT

An insert plate is formed by a base portion, a coupling portion and a mesh material. Notches are formed on both sides of a connecting position at which the coupling portion and the base portion are connected. Accordingly, a line which connects bottoms of the respective notches is defined as a position of a center of unfolding of an unfolding portion of an air bag cover. Since a plurality of slits are formed in the coupling portion to weaken the coupling portion, the unfolding portion can be reliably unfolded about the line for which connects the bottoms of the respective notches. Further, ends of adjacent slits are staggered to prevent a crack from spreading along the entire coupling portion even if the coupling portion is cracked.

20 Claims, 7 Drawing Sheets

INSERT MATERIAL OF AIR BAG COVER

This application is a Continuation of Ser. No. 07/945,150, filed Sep. 15, 1992, now abandoned.

BACKGROUND OF THE INVENTION

1. Field of the Invention

The present invention relates to an insert material embedded in an air bag cover including an unfolding portion which is unfolded by a bag body swelling toward a driver when a vehicle is rapidly decelerated.

2. Background Information

In an air bag apparatus, for example, in an air bag apparatus of a type which is mounted on a steering wheel, a circular hole 100 is formed in an intermediate portion of a substantially box-shaped base plate 102 as shown in FIG. 7. An unillustrated inflator is arranged in the circular hole 100 of the base plate 102 to emit gas when a vehicle is rapidly decelerated. A substantially frame-shaped insert plate 104 is fitted with the base plate 102, and they are connected with each other by an unillustrated bolt or the like. The insert plate 104 is embedded in an air bag cover 106 (see FIG. 6) by insert molding. The insert plate 104 is provided with a rectangular frame-shaped base portion 104A, a pair of mesh materials 104B and 104C embedded in unfolding portions 106A and 106B of the air bag cover 106 as will be described below, and coupling portions 104D and 104E coupling the base portion 104A with the mesh materials 104B and 104C. The mesh materials 104B and 104C serve to prevent the unfolding portions 106A, 106B of the air bag cover 106 from scattering. The unfolding portions 106A, 106B of the air bag cover 106 are unfolded by an unillustrated bag body swelling toward a driver.

However, as shown in FIG. 6, if the above-mentioned air bag cover 106 is unfolded when the vehicle is rapidly decelerated, the coupling portions 104D and 104E (which are also shown in FIG. 6) coupling the mesh materials 104A, 104B with the insert plate 104 are defined as center positions about which the air bag cover 106 unfolds. Accordingly, a substantial opening width at a time when the bag body is swelled becomes narrow and is equal to a distance P between inner surfaces of the unfolding portions 106A and 106B of the air bag cover 106. Therefore, in conventional air bag apparatus, nain cloth forming the bag body has high strength so that the bag body swelling out of the opening having the narrow width is not damaged. As a result, there are some drawbacks such as the bag body being manufactured at a high cost.

In order to overcome the drawbacks, as shown in FIG. 5, an air bag cover 110 may be made large so as to provide an opening width Q larger than the opening width P at a time when the respective unfolding portions 110A and 110B unfold. However, if the air bag cover 110 itself is enlarged, there is another drawback in that degree of freedom in designing the air bag cover 110 is reduced.

SUMMARY OF THE INVENTION

In view of the facts set forth above, it is an object of the present invention to provide an insert material of an air bag cover so as to provide a larger opening width when the air bag cover unfolds, without employing a large-sized air bag cover.

An insert material of the present invention is embedded inside an air bag cover having an unfolding portion which is unfolded by a bag body swelling toward a driver when a vehicle is rapidly decelerated, and which is connected to a base member containing the bag body between the base member and the air bag cover. The insert material includes a base portion positioned on the side of the base member, a supporting portion embedded inside the unfolding portion in the same way as the base portion, and a coupling portion for coupling the base portion and the supporting portion. The insert material is provided with shift means of a position of center of unfolding which are provided on both sides of a connecting position at which the base portion and the coupling portion arc connected, for shifting a position of a center of unfolding of the unfolding portion from an end of the base portion on a side of the driver toward a side opposite to the driver by a predetermined length, and a plurality of weakening portions provided in the coupling portion at predetermined intervals along a direction intersecting a swelling direction of the bag body and provided such that adjacent ends of the weakening portions are staggered with respect to the swelling direction of the bag body, so as to reduce rigidity of the coupling portion.

According to the present invention constructed as set forth above, the shift means of a position of a center of unfolding are provided on both sides of the connecting portion at which the base portion and the coupling portion of the insert material embedded in the air bag cover are connected. Further, the coupling portion of the insert material is provided with the plurality of weakening portions at predetermined intervals in the direction intersecting the swelling direction of the bag body. The unfolded portion of the air bag cover is unfolded by the bag body swelling toward the driver when the vehicle is rapidly decelerated. At this time, the position of the center of unfolding is shifted by the shift means of a position of a center of unfolding, from the end of the base portion of the insert material on the side of the driver toward a side opposite to the driver by the predetermined length. In addition, the coupling portion is provided with the weakening portions to reduce the rigidity of the coupling portion. Consequently, the unfolding portion can be reliably unfolded at the shifted position of the center of unfolding. As a result, it is possible to provide a larger opening width than a conventional opening width when the unfolding portion of the air bag cover unfolds, without employing a large-sized air bag cover. Hence, the swelling operation of the bag body occurs smoothly. Further, the coupling portion is provided with the plurality of weakening portions, and the respective ends of adjacent weakening portions are staggered along the swelling direction of the bag body. Accordingly, even if the coupling portion weakened by the weakening portions is cracked due to the unfolding force of the unfolding portion, cracks do not form between the respective ends of adjacent weakening portions. Therefore, the unfolding portion is never broken due to the cracks forming along the entire the coupling portion of the insert material.

DESCRIPTION OF THE PREFERRED EMBODIMENTS

An air bag apparatus 10 in a preferred embodiment will be described hereinafter with reference to FIGS. 1 to 3.

Figure 3:
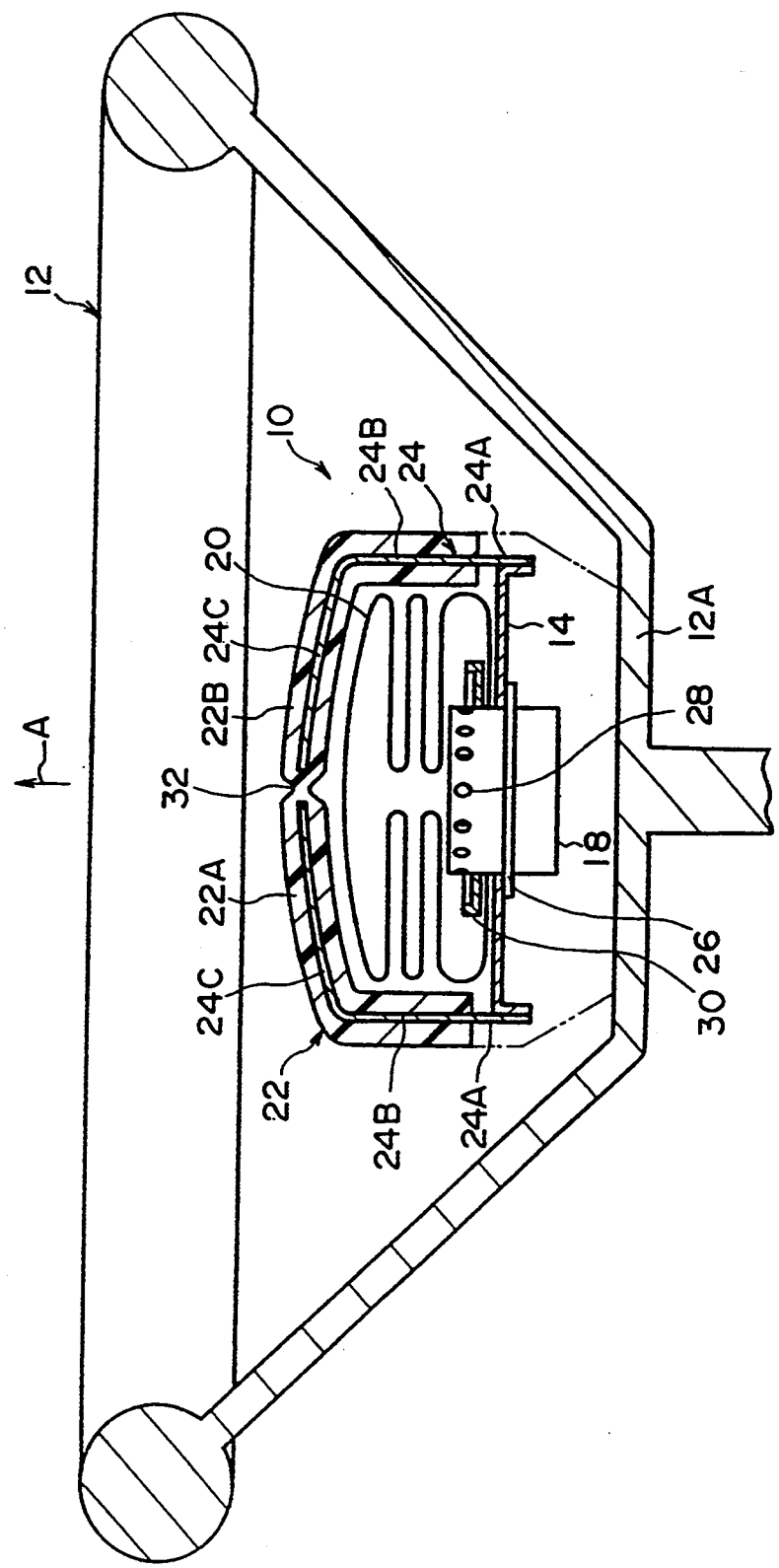
FIG. 3 is a schematic sectional view of an air bag apparatus equipped with the insert plate of FIG. 1 and mounted on a steering wheel.

The air bag apparatus 10 is mounted on a hub 12A of a steering wheel 12 as shown in FIG. 3. The air bag apparatus 10 is provided with a substantially box-shaped base plate 14, and a circular hole 16 (see FIG. 1) is formed in a central portion of the base plate 14. An inflator 18, a bag body 20 and an insert plate 24, which is embedded in an air bag cover 22 and serves as an insert material, are mounted on the base plate 14.

The inflator 18 is provided in a substantially cylindrical form. A flange 26 is formed on an axially intermediate portion of the inflator 18. The flange 26 has a square form as seen from above. The inflator 18 is arranged so as to pass through the circular hole 16 from the side of the base plate 14 opposite to a driver. The inflator 18 includes an unillustrated starting apparatus, an unillustrated detonator, an unillustrated booster, an unillustrated gas generating material and the like. The starting apparatus a state of rapid deceleration of the vehicle. The detonator is ignited by the actuating of the starting apparatus. The booster serves to promote the growth of a spark of the detonator. The gas generating material generates a large quantity of gas when burned through the booster. The gas is emitted from a plurality of gas holes 28 into the bag body 20 as will be described hereinafter. The gas holes 28 are provided on a peripheral surface of the inflator 18 on the side of the driver.

The bag body 20 is in a folded condition and is contained between the air bag cover 22 and the base plate 14. A circular opening portion is formed in a portion of the bag body 20 on the side opposite to the driver, and a ring plate 30 is arranged inside the opening portion. The ring plate 30 is clamped with the base plate 14 and the flange 26 of the inflator 18 by an unillustrated bolt or the like. Accordingly, a peripheral edge of the opening portion of the bag body 20 is pressed against the base plate 14.

The air bag cover 22 has a substantially box-shaped form, and has an H-shaped thin-walled portion 32 (see FIG. 3) which is provided on a surface of the air bag cover 22 on the side of the driver. When the vehicle is rapidly decelerated, the air bag cover 22 is broken at the thin-walled portion 32. Thus, the thin-walled portion 32 is broken, and the air bag cover 22 is separated into a pair of unfolding portions 22A and 22B (see FIG. 2). The pair of unfolding portions 22A, 22B unfold in directions of moving away from each other. An insert plate 24 is embedded in the air bag cover 22 by insert molding.

Figure 1:
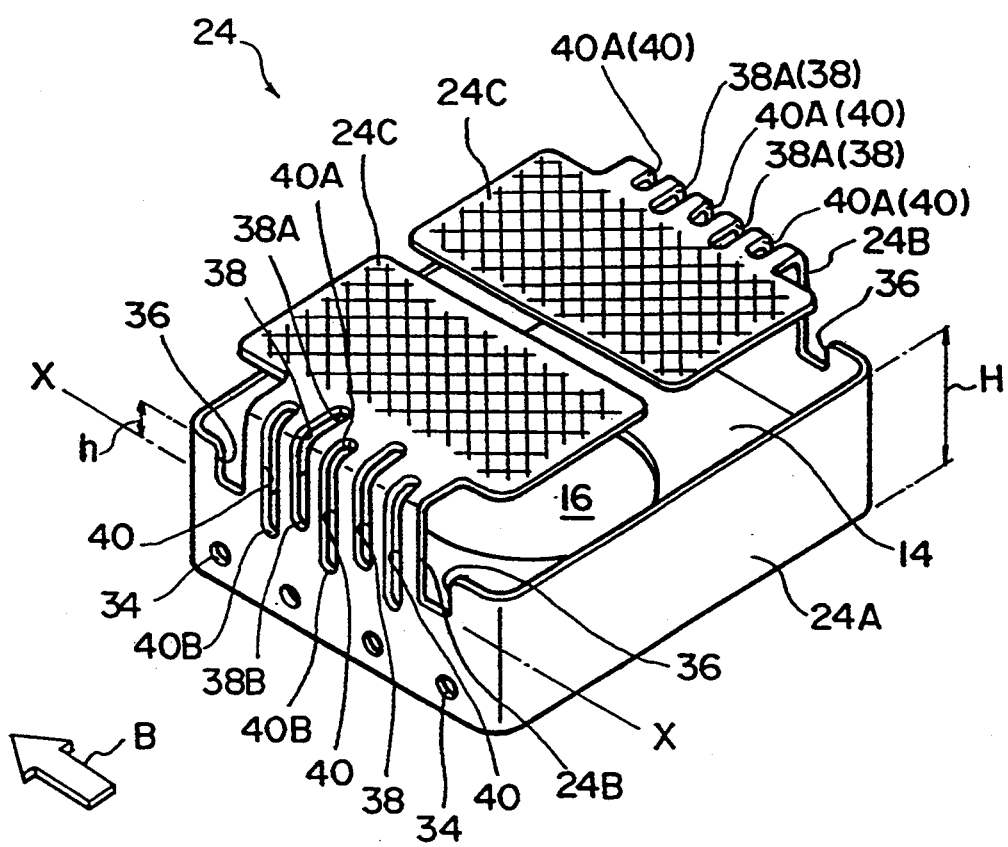
FIG. 1 is a perspective view of an insert plate showing one embodiment of an insert material of an air bag cover of the present invention.
Figure 2:
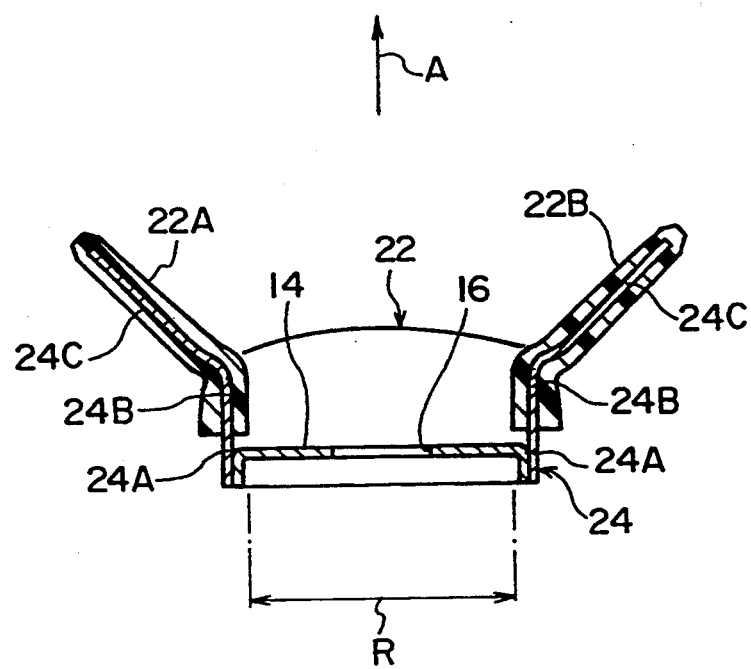
FIG. 2 is a sectional view showing an unfolded condition of the air bag cover equipped with the insert plate of FIG. 1.
Figure 7:
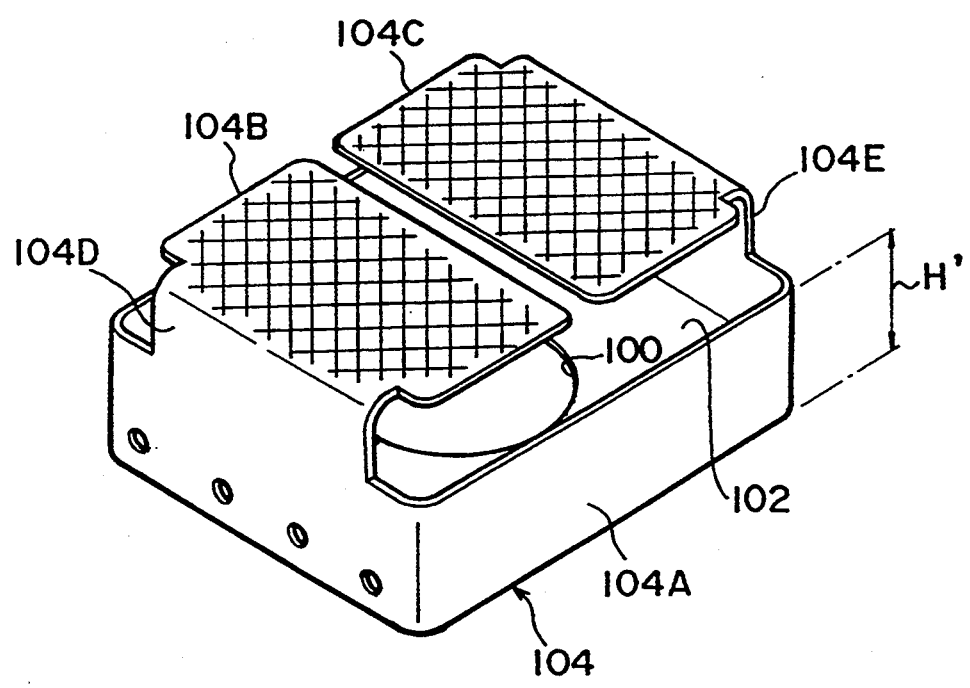
FIG. 7 is a perspective view corresponding to FIG. 1, showing the insert plate embedded in the conventional air bag cover of FIG. 6.

Referring now to FIG. 1, the insert plate 24 is provided with a base portion 24A having a substantially rectangular frame-shaped form. A height H of the base portion 24A is identical to a height H' of the base portion 104A of the conventional insert plate 104 (see FIG. 7). A plurality of mounting holes 34 are formed in a pair of opposite side portions of the base portion 24A to mount the base portion 24A on the base plate 14. Mesh materials 24C serving as supporting portions are integrally formed with the side portions through coupling portions 24B. The mesh materials 24C are embedded in the pair of unfolding portions 22A and 22B of the air bag cover 22 as shown in FIG. 2. The mesh materials 24C are provided to prevent resin (for example, urethane) of the unfolding portions 22A, 22B from scattering when the unfolding portions 22A and 22B unfold in directions of moving away from each other when the vehicle is rapidly decelerated.

Notches 36 are formed on both sides of connecting positions at which the coupling portions 24B and the base portion 24A are connected. The respective rectangular notches 36 are provided to serve as shift means of the positions of the centers of unfolding. The notch 36 is notched such that the notched direction thereof is opposed to the swelling direction of the bag body (i.e., the direction shown by arrow A in FIGS. 2 and 3 ). Notched length h is equal to about one-third of the height H of the base portion 24A. The notched length h can be appropriately varied depending upon the strength of the insert plate 24. Lines X—X connecting the bases of the notches 36 are defined as positions of the centers of unfolding of the unfolding portions 22A, 22B.

A plurality of slits 38 and 40, which serve as weakening portions which weaken the coupling portions 24B, are provided in the coupling portions 24B. The longitudinal directions of the slits 38, 40 run along the swelling direction of the bag body 20. These slits 38, 40 are disposed parallel to each other along the direction perpendicular to the swelling direction of the bag body 20 (i.e., in the direction shown by arrow B in FIG. 1) and are spaced apart at predetermined intervals. Both ends 38A, 38B in the longitudinal direction of the slit 38 are respectively adjacent to both ends 40A, 40B in the longitudinal direction of the slit 40. Further, the ends 38A and 40A and the ends 38B and 40B respectively are staggered with respect to each other by a predetermined length along the swelling direction of the bag body 20 (i.e., in the direction shown by arrow A in FIGS. 2 and 3). That is, a line for connecting the respective ends 38A and 40A in the longitudinal direction (or the ends 38B and 40B in the longitudinal direction) of the slits 38 and 40 can be described as a corrugated curve.

A description will be given of the operation of the embodiment hereinafter.

The starting apparatus is not actuated during the normal traveling condition of the vehicle so that the air bag apparatus 10 is not actuated. Accordingly, the unfolding portions 22A and 22B do not unfold, and the insert plate 24 is also left in the condition shown in FIG. 1.

If the vehicle in this condition is rapidly decelerated, the starting apparatus is actuated to emit a large amount of gas from the inflator 18 into the bag body 20. Consequently, the bag body 20 is swelled to press the unfolding portions 22A and 22B in the swelling direction of the bag body 20 (i.e., in the direction shown by arrow A in FIG. 2) from surfaces of the unfolding portions 22A and 22B on the side opposite to the driver. The thin-walled portion 32 of the air bag cover 22 is thereby broken so that the pair of unfolding portions 22A, 22B unfold in directions of moving away from each other.

At this time, the lines X—X for connecting the bases of the notches 36 of the base portion 24A (see FIG. 1) serve as the positions of the centers of unfolding of the unfolding portions 22A and 22B, because the pair of notches 36 are formed at the connecting positions at which the coupling portion 24B and the base portion 24A are connected. In addition, since the plurality of slits 38, 40 are formed in the coupling portions 24B, the rigidity of the coupling portions 24B decreases, and the coupling portions 24B are weakened. Therefore, no resistance is provided to the unfolding operation of the unfolding portions 22A, 22B, and the lines X—X can be reliably defined as the positions of the centers of unfolding of the unfolding portions 22A and 22B. Accordingly, it is possible to smoothly unfold the unfolding portions 22A, 22B in directions of moving away from each other with the lines X—X as centers of the unfolding. The X—X lines serve as the positions of the centers of unfolding, and extend across positions of the base portion 24A which are notched by the length h from an end surface of the base portion 24A on the side of the driver in the direction opposite to the driver. As a result, though the air bag cover 22 itself is the same size as conventional air bag covers, it is possible to provide a larger opening width R for the swelling of the bag body 20 than the conventional opening width P. Consequently, the bag body 20 can swell smoothly, and the swelled bag body 20 is interposed between the driver and the steering wheel 12.

As described above, in the present embodiment, the pair of notches 36 are formed at both sides of the connecting positions at which the base portion 24A of the insert plate 24 and the coupling portion 24B are connected. Accordingly, the positions of the centers of unfolding of the unfolding portions 22A and 22B can be shifted toward the side opposite to the driver by the notched length h. Further, since the plurality of slits 38, 40 are formed in the coupling portions 24B, it is possible to reduce the rigidity of the coupling portion 24B, and to reliably shift the positions of the centers of unfolding of the unfolding portions 22A, 22B to the lines X—X. Therefore, the larger opening width R of the bag body 20 is provided so that the bag body 20 can swell smoothly.

In the present embodiment, the line for which connects the ends of the slits 38, 40 along the direction perpendicular to the swelling direction of the bag body 20 can be described as a corrugated line. Thus, even if the coupling portions 24B are cracked due to the swelling force of the bag body 20, it is possible to prevent the coupling portions 24B from being broken due to cracks which extend between the ends of the adjacent slits 38, 40. As a result, breaking of the unfolding portions 22A, 22B can be prevented.

Figure 4:
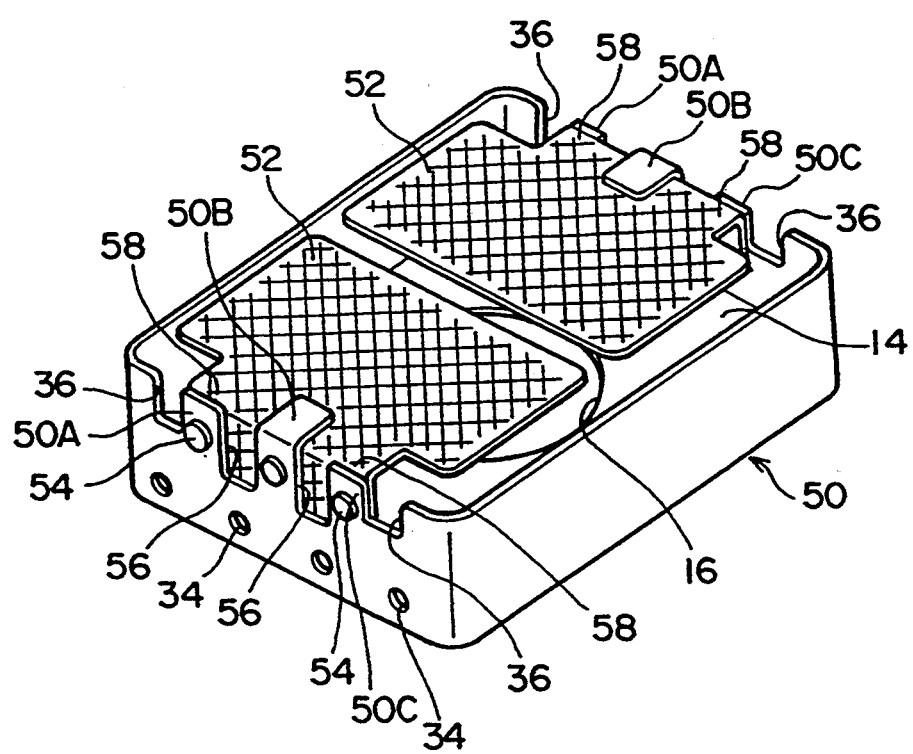
FIG. 4 is a perspective view corresponding to FIG. 1, showing a modified embodiment of the insert plate of FIG. 1.
Figure 5:
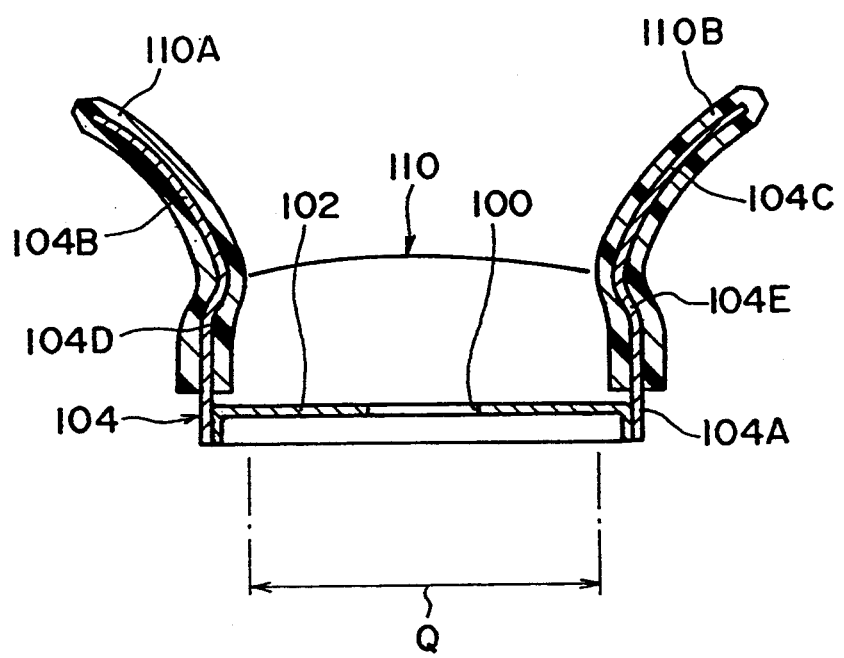
FIG. 5 is a sectional view corresponding to FIG. 2, showing an unfolded condition of unfolding portions in a conventional air bag apparatus having a large-sized air bag cover.
Figure 6:
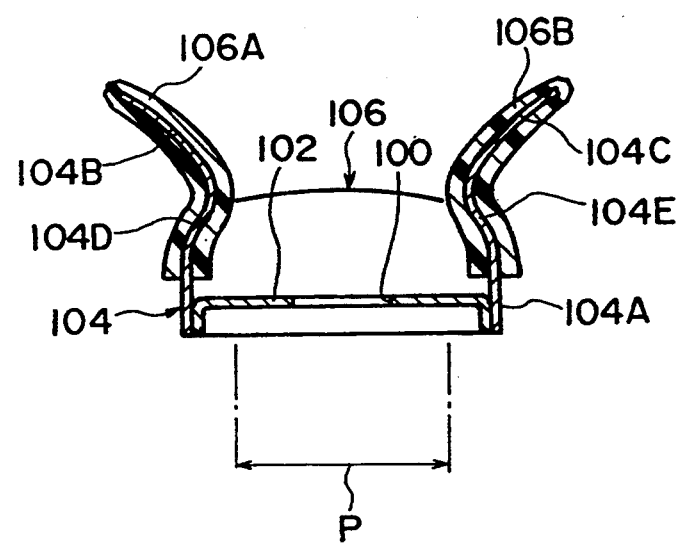
FIG. 6 is a sectional view corresponding to FIG. 2, showing an unfolded condition of unfolding portions in a conventional air bag apparatus having a standard size air bag cover.

In the present embodiment, the mesh materials 24C, the coupling portions 24B and the base portion 24A are integrally formed with each other to form the insert plate 24, and the plurality of slits 38, 40 are formed in the coupling portions 24B. However, the present invention should not be limited to the embodiment, and may be applied to all constructions which can weaken the coupling portions 24B and can reliably shift the positions of the centers of unfolding of the unfolding portions 22A, 22B to the lines X—X. For example, as shown in FIG. 4, an insert plate 50 and a mesh material 52 may be formed separately. Further, the insert plate 50 may be provided with tongue piece-shaped coupling portions 50A, 50B and 50C having different longitudinal lengths. These coupling portions 50A, 50B and 50C may be fixed with the mesh material 52 by a vis 54. In this case, grooves 56 and upper end opening portions 58 of the coupling portions 50A, 50C serve as weakening portions. The grooves 56 are respectively disposed between the adjacent coupling portions 50A and 50B, and between the adjacent coupling portions 50B and 50C. The upper end opening portions 58 of the coupling portions 50A, 50C communicate with the grooves 56. Moreover, a plurality of small holes may be formed at the same positions as the positions of the slits 38, 40 instead of the slits 38, 40. Alternatively, concave portions or the like may be provided instead of the slits 38, 40 to provide thin-walled coupling portions.

In the embodiment, the pair of notches 36 is formed at the connecting positions at which the coupling portion 24B and the base portion 24A are connected. However, the present invention should not be limited to the embodiment, and may be applied to all constructions which can shift the positions of the centers of unfolding of the unfolding portions 22A and 22B in the direction opposite to the driver.

What is claimed is:

1. An insert material embedded inside an air bag cover having an unfolding portion which is unfolded by a bag body swelling toward a driver when a vehicle is rapidly decelerated, and connected to a base member containing said bag body between said base member and said air bag cover, and including a base portion positioned in a direction of said base member with respect to said air bag cover, a supporting portion embedded inside said unfolding portion in the same way as said base portion, and a coupling portion for coupling said base portion and said supporting portion, said insert material comprising:

shift means of a position of a center of unfolding provided on both sides of a connecting position at which said base portion and said coupling portion are connected, for shifting a position of a center of unfolding of said unfolding portion from an end of said base portion on a side of the driver toward a side opposite to the driver by a predetermined length; and a plurality of weakening portions provided in said coupling portion at predetermined intervals along a direction intersecting a swelling direction of said bag body and provided such that adjacent ends of said weakening portions are staggered with respect to the swelling direction of said bag body, so as to reduce rigidity of said coupling portion and to prevent the detachment of said unfolding portion from said base member due to the formation of cracks between respective ends of the weakening portions.

2. An insert material according to claim 1, wherein said shift means of a position of a center of unfolding is notches which are notched from said end of said base portion on the side of the driver toward the side opposite to the driver.

3. An insert material according to claim 2, wherein said notches are provided such that a length of each of said notches, from said end of said base portion on the side of the driver, is equal to approximately one third of a height of said base portion.

4. An insert material according to claim 3, wherein said base portion, said supporting portion and said coupling portion are integrally formed with each other.

5. An insert material according to claim 4, wherein said plurality of weakening portions is provided such that longitudinal directions thereof run along the swelling direction of said bag body.

6. An insert material according to claim 3, wherein said base portion, said supporting portion and said coupling portion are formed separately.

7. An insert material according to claim 6, wherein said plurality of weakening portions is provided such that longitudinal directions thereof run along the swelling direction of said bag body.

8. An insert material according to claim 4, wherein each of said plurality of weakening portions is formed of a plurality of rows of adjacent circular through-holes disposed along the swelling direction of said bag body.

9. An insert material according to claim 5, wherein said plurality of weakening portions is slits.

10. An insert material according to claim 5, wherein said plurality of weakening portions is thin-walled portions formed by said coupling portion being notched in a direction of thickness of said coupling portion.

11. An insert material according to claim 7, wherein said plurality of weakening portions is grooves notched from said end of said base portion on the side of the driver toward the side opposite to the driver.

12. An air bag cover having an unfolding portion which is unfolded by a bag body swelling toward a driver when a vehicle is rapidly decelerated, said air bag cover comprising:

an insert material embedded inside said air bag cover, and connected to a base member containing said bag body between said base member and said air bag cover, and including a base portion positioned in the direction of said base member with respect to said air bag cover, a supporting portion embedded inside said unfolding portion in a same way as said base portion, and a coupling portion for coupling said base portion and said supporting portion;

shift means for a position of a center of unfolding provided on both sides of a connecting position at which said base portion and said coupling portion are connected, for shifting a position of a center of unfolding said unfolding portion from an end of said base portion on a side of the driver toward a side opposite to the driver by a predetermined length; and a plurality of weakening portions provided in said coupling portion at a predetermined intervals along a direction intersecting a swelling direction of said bag body and provided such that adjacent ends of said weakening portions are staggered with respect to the swelling direction of said bag body, so as to reduce rigidity of said coupling portion and to prevent the detachment of said unfolding portion from said base member due to the formation of cracks between respective ends of the weakening portions.

13. An air bag cover according to claim 12, wherein said shift means of a position of a center of unfolding is notches which are notched from said end of said base portion on the side of the driver toward the side opposite to the driver.

14. An air bag cover according to claim 13, wherein said notches are provided such that a length of each of said notches, from said end of said base portion on the side of the driver, is equal to approximately one-third of a height of said base portion.

15. An air bag cover according to claim 14, wherein said base portion, said supporting portion and said coupling portion are integrally formed with each other.

16. An air bag cover according to claim 14, wherein said base portion, said supporting portion and said coupling portion are formed separately.

17. An air bag cover according to claim 15, wherein each of said plurality of weakening portions comprises a plurality of rows of adjacent circular through-holes disposed along the swelling direction of said bag body.

18. An air bag cover according to claim 15, wherein said plurality of weakening portions is slits.

19. An air bag cover according to claim 15, wherein said plurality of weakening portions is thin-walled portions formed by said coupling portion being notched in a direction of thickness of said coupling portion.

20. An air bag cover according to claim 16, wherein said plurality of weakening portions is grooves notched from said end of said base portion on the side of the driver toward the side opposite to the driver.

* * * * *